Feb. 22, 1938.    G. A. KLIMEK    2,108,986
SYNCHRO SELECTIVE CONSTANT MESH TRANSMISSION
Filed June 12, 1935    3 Sheets-Sheet 1

INVENTOR.
GUSTAV A. KLIMEK
BY Hoguet, Neary & Campbell
his ATTORNEYS

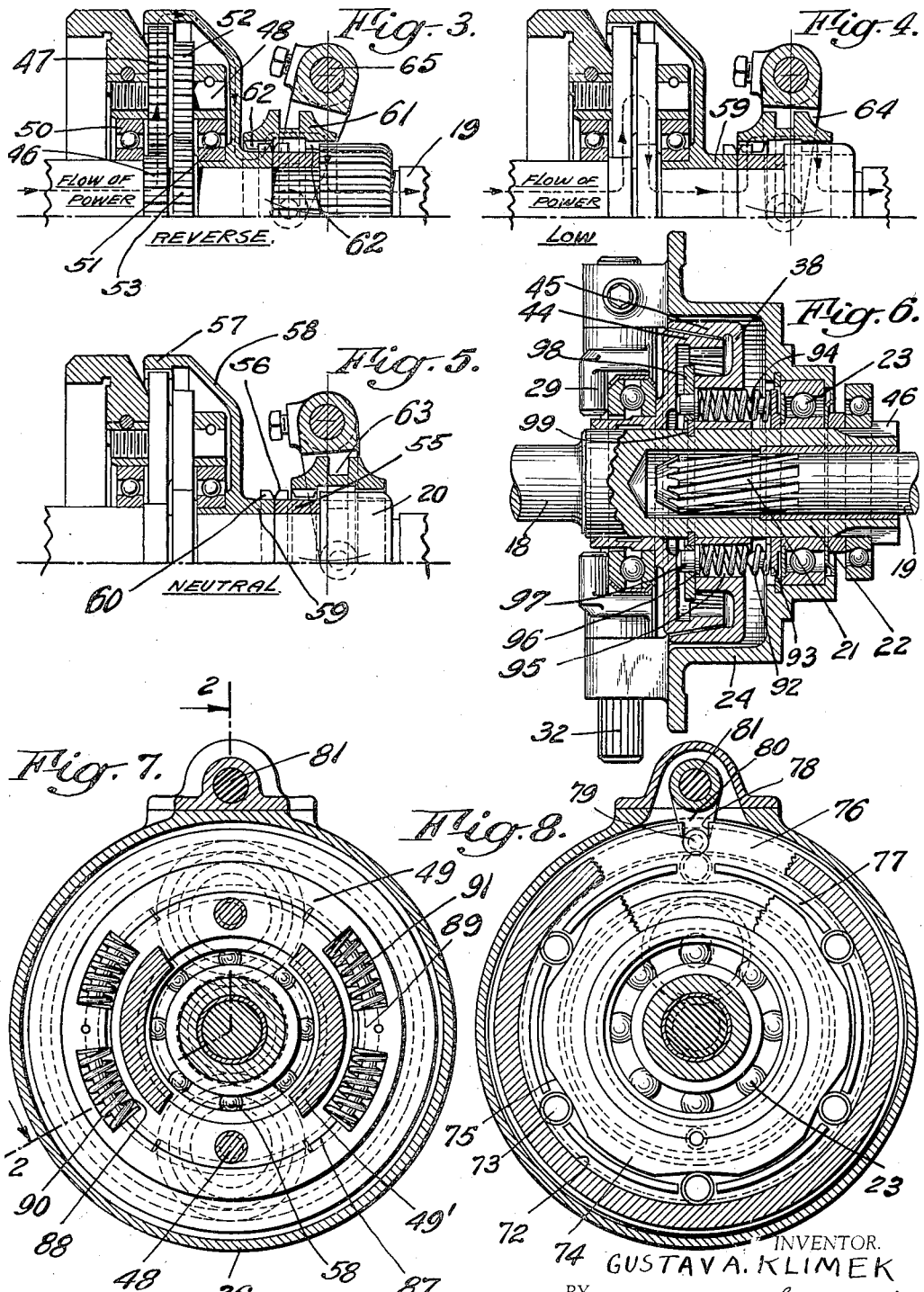

Feb. 22, 1938.    G. A. KLIMEK    2,108,986
SYNCHRO SELECTIVE CONSTANT MESH TRANSMISSION
Filed June 12, 1935    3 Sheets-Sheet 3
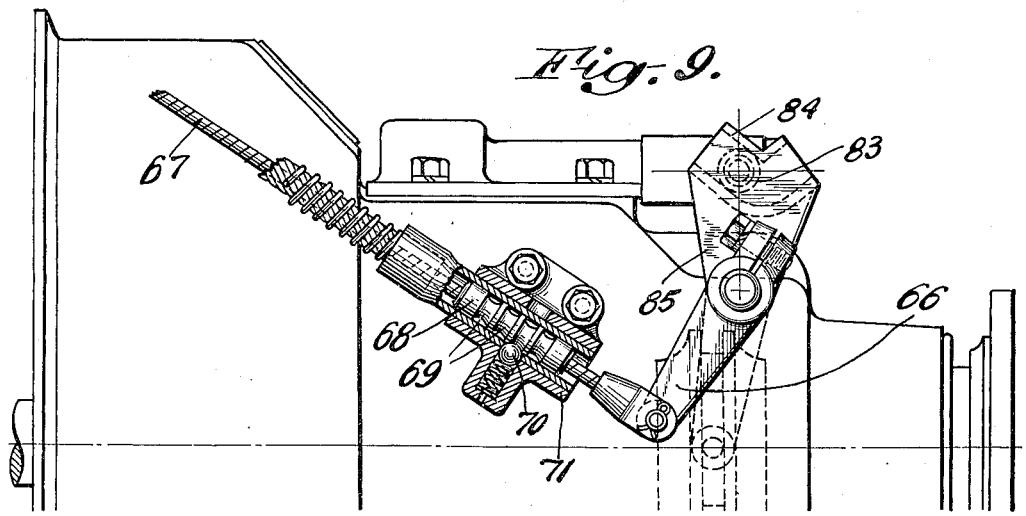
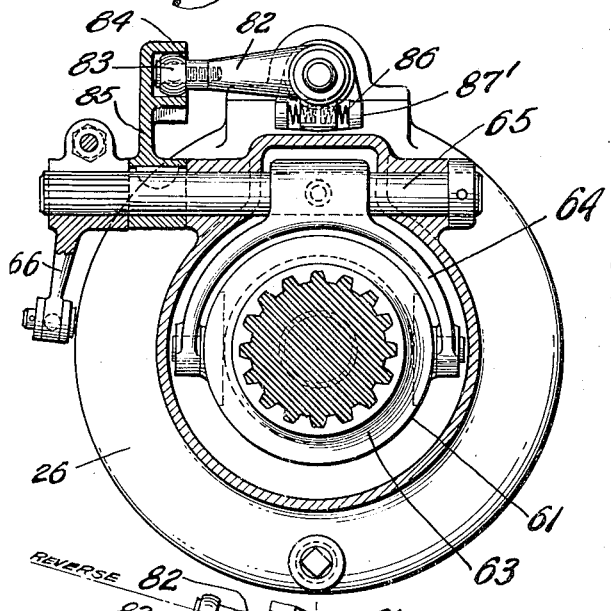
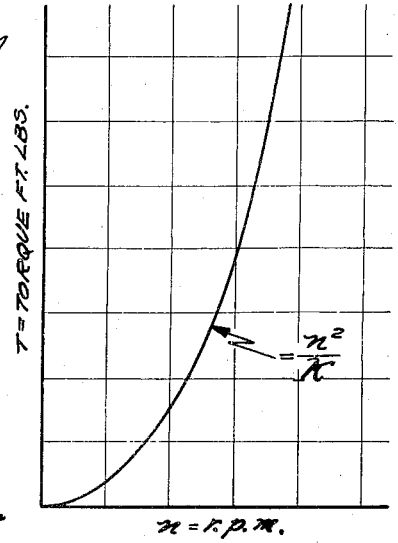
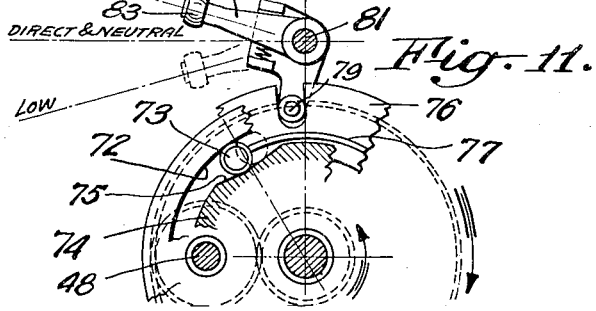
INVENTOR.
GUSTAV A. KLIMEK
BY his
Hoguet, Neary & Campbell
ATTORNEYS Patented Feb. 22, 1938

2,108,986

UNITED STATES PATENT OFFICE 2,108,986

SYNCHRO SELECTIVE CONSTANT MESH TRANSMISSION

Gustav A. Klimek, East Rutherford, N. J., assignor to Diehl Corporation, New York, N. Y., a corporation of New York Application June 12, 1935, Serial No. 26,111

13 Claims. (Cl. 74—259)

The present invention relates to transmission mechanisms and embodies, more specifically, an improved power transmission system by means of which a plurality of speed changes may be effected through a plurality of constant mesh gear trains with absolute synchronization of the relatively moving parts under all conditions of operation.

More particularly, the invention embodies an improved change speed mechanism which is adapted for use in connection with torque converters embodying an inertia impulse transmitter having a torque characteristic such that at idling speed no appreciable torque is transmitted. Such forms of transmitters are illustrated in the applicant's copending applications Serial No. 736,876, filed July 25, 1934 for Torque converter; Serial No. 757,293, filed December 13, 1934 for Power transmitter; and Serial No. 20,935 filed May 11, 1935 for Torque converter.

In connection with the above type of converter, the present invention proposes to provide a transmission mechanism wherein the power transmitting elements are coaxial and in constant mesh, provision being made for the convenient shifting of speed connections without possibility of clash and by means of operations which positively insure synchronization of the driving and driven parts to be connected.

The invention further proposes to provide an improved control mechanism for transmissions of the above character wherein means is provided for establishing a driving connection in either reverse or forward directions, such means being controlled automatically by the selecting mechanism for selecting proper speed change connections.

A further object of the invention is to provide, in combination with impulse transmitters of the character above referred to, a power transmission mechanism by means of which the teeth of a clutch member connecting driving and driven members may be relieved of tangential pressure prior to the actual shifting thereof into a predetermined connecting position.

A further object of the invention is to provide a transmission mechanism of the above character wherein control of a plurality of transmission trains may be effected conveniently and effectively at the time the clutch member is actuated to effect a predetermined speed connection.

Further objects not specifically enumerated above, will be apparent as the invention is described in further detail in connection with the accompanying drawings, wherein Figure 1 is a view in side elevation, partly broken away and in section, showing a power unit and impulse transmitter in connection with which the present invention may be used;

Figure 3 is a detailed view similar to a portion of Figure 2, showing the speed change mechanism in the reverse position;

Figure 4 is a view similar to Figure 3 showing the elements connected for low speed driving;

Figure 5 is a view similar to Figure 3, showing the elements in neutral position;

Figure 6 is a view in section, taken on the line 6—6 of Figure 2 and looking in the direction of the arrows;

Figure 7 is a view in transverse section taken on line 7—7 of Figure 2 and looking in the direction of the arrows;

Figure 8 is a transverse view in section taken on the line 8—8 of Figure 2 and looking in the direction of the arrows;

Figure 9 is an enlarged partial view in side elevation showing the control mechanism by means of which various speed changes may be effected;

Figure 10 is a view in section taken on the line 10—10 of Figure 2 and looking in the direction of the arrows;

Figure 11 is a view in end elevation showing the portion of the control mechanism by means of which the free wheeling mechanism may be controlled; and Figure 12 is a diagrammatic illustration of the speed torque curve of the impulse transmitter in connection with which the speed change mechanism of the present invention is adapted to be used.

Figure 1:
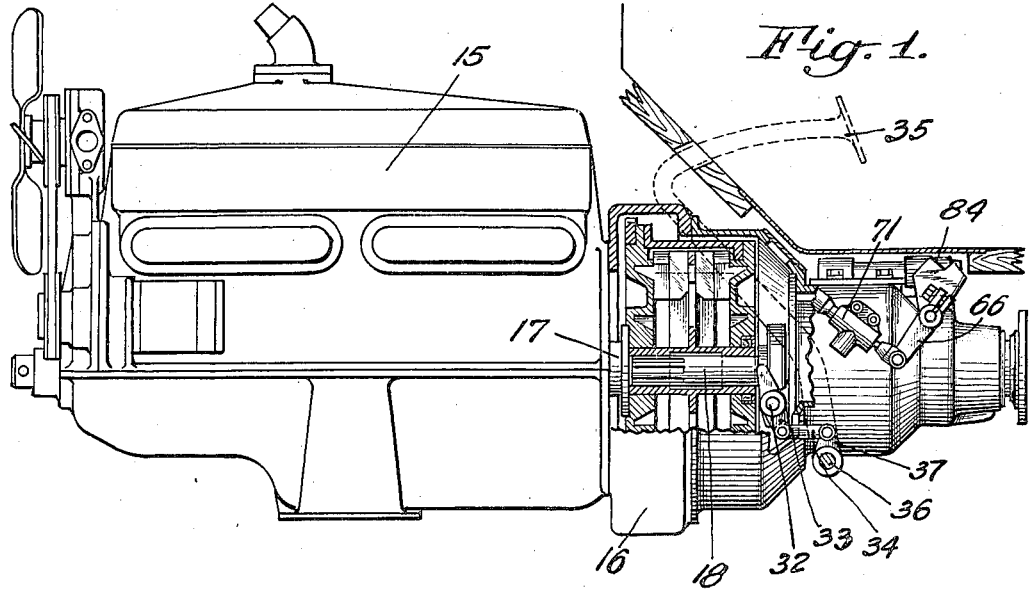

With reference to the above drawings, Figure 1 illustrates a power plant and transmission unit, the power plant being indicated at 15 and the impulse transmitter of the centrifugal or inertia type at 16. This transmitter is driven by the crank shaft 17 of the engine and is adapted to drive a shaft 18 which forms the driving shaft of the transmission mechanism of the present invention.

Figure 2:
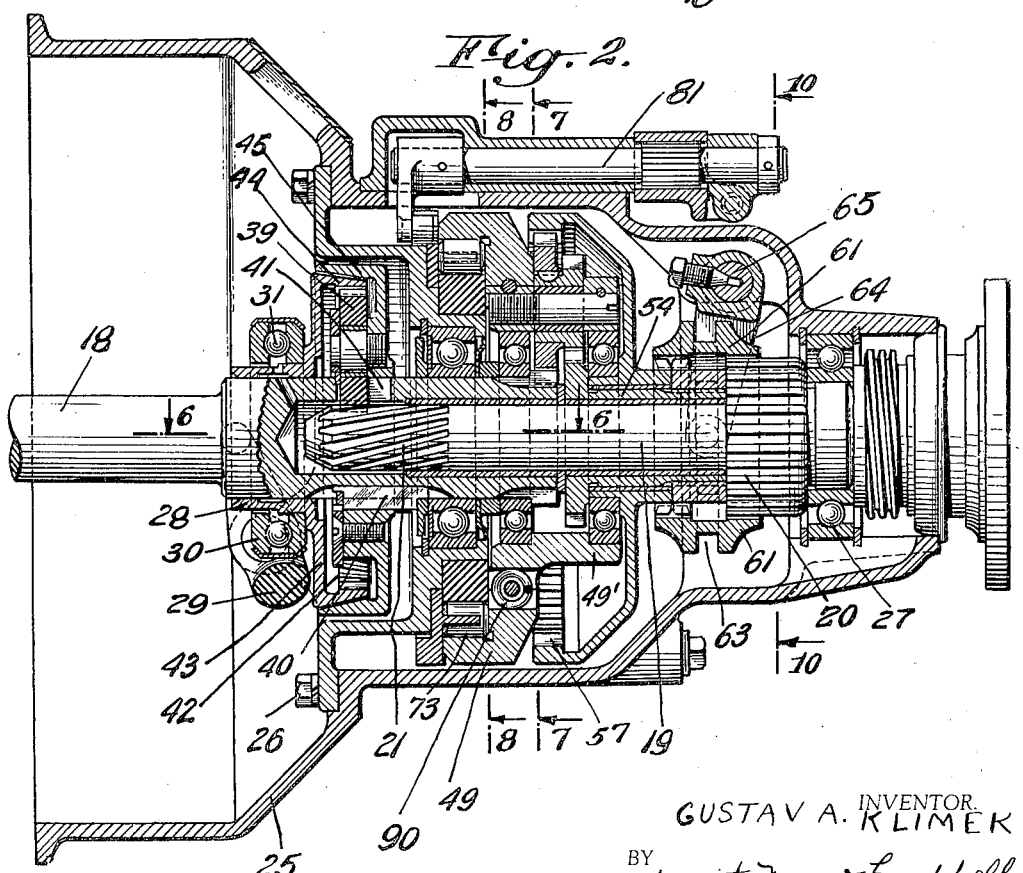
Figure 2 is an enlarged view in section, taken on the broken line 2—2 of Figure 7 and looking in the direction of the arrows, this view illustrating a preferred form of transmission mechanism constructed in accordance with the present invention.

Figure 2 illustrates the power transmission mechanism of the present invention, the driving shaft 18 being shown on larger scale than the scale of Figure 1, the transmission mechanism being adapted to drive a driven shaft 19 upon which clutch teeth 20 are formed. The shaft 19 is provided with spiral teeth 21 at the end thereof and is journaled in a cylindrical extension 22 of the driving shaft 18. The cylindrical extension 22 is journaled in a bearing 23 which is carried by a flange mounting 24, bolted to a housing 25 at 26. The driven shaft is journaled in the housing 25 by means of a bearing 27.

Upon the driving shaft 18 is journaled a sleeve 28 which is adapted to be actuated by a yoke 29 which operates through a thrust collar 30 and bearing 31. The yoke 29 is formed upon a shaft 32 (Figure 1) which is provided with an arm 33, to the extremity of which a link 34 is pivoted, the link 34 being actuated by a foot pedal 35 which is mounted upon a shaft 36 and actuates an arm 37 to which the link 34 is pivoted.

Sleeve 28 is thus actuated by the pedal 35 to lock a planetary transmission system comprising a pinion mounting 38 upon which a planet pinion 39 is journaled. The pinion mounting 38 is keyed to the sleeve 22 by means of key 40 and is thus slidably but non-rotatably mounted upon the sleeve 22. The sleeve 22 is formed with an aperture 41 through which the planet pinion extends to engage the spiral threads 21 on the driven shaft 19. A ring gear 42 is formed upon a flange 43 upon the sleeve 28, the flange 43 and pinion mounting 38 being provided with cooperating conical friction members 44 and 45, respectively. When the thrust bearing 31 is moving to the right, as seen in Figure 2, the conical friction members 44 and 45 will be brought into engagement to lock the planetary gear system above described and thus prevent rotation of the planet pinion 39. Further axial movement of the thrust collar 30 causes the driven shaft 19 to be turned with respect to the driving shaft by reason of the axial movement of the planet pinion 39 with respect thereto along the spiral teeth 21, and thus tangential pressure on the clutch teeth 20 is relieved. This tangential pressure arises by reason of the fact that the foregoing transmission mechanism is used in connection with a centrifugal or inertia impulse transmitter of the character above defined. By relieving the teeth of the clutch member 20 from tangential pressure, synchronization thereof with cooperating clutch members is accomplished, a condition which otherwise could not be established with the tangential pressure existing as above noted.

The mechanism by means of which various speed change connections may be accomplished will now be described. The end of sleeve 22 is formed with teeth 46 which form a gear with which pinions 47 are adapted to engage. The pinions 47 are mounted upon stub shafts 48 which are carried by a relatively stationary ring mounting 49. The ring mounting 49 is journaled upon the sleeve 22 by means of bearings 50 and 51.

Integral with the pinions 47 are pinions 52 which are adapted to engage a gear 53 which is formed upon a sleeve 54, journaled upon the driven shaft 19. Sleeve 54 is provided with a collar 55, upon which clutch teeth 56 are formed.

Pinions 47 engage an internal gear 57, formed upon a flange 58 which is provided with a sleeve 59, journaled upon the sleeve 54. Clutch teeth 60 are formed upon the sleeve 59 and are coaxial with the teeth 56, both of the said clutch teeth being coaxial with the teeth of the clutch member 20.

A collar 61 is slidable upon the clutch member 20 and is provided with widened teeth 62 which are adapted to engage either set of teeth 56 or 60, or both sets simultaneously. Teeth 56 are spaced axially from the clutch member 20 a sufficient distance to permit the teeth 62 to be received in such space without engaging either of the said teeth 56 or 60.

Collar 61 is formed with a peripheral groove 63 which is adapted to be engaged by a yoke 64 which is rotated by means of a shaft 65 (Figure 10), the shaft 65 being actuated by an arm 66 secured thereto. The arm 66 is actuated by a manually operated member 67 which, for convenience and greater accuracy, is formed with a collar 68 having a plurality of grooves 69 formed therein. A spring pressed ball 70 carried by a supporting member 71 is adapted to engage the grooves 69 to maintain the manually operated member 67 yieldingly in predetermined positions.

With reference to Figures 2, 3, 4 and 5, the mechanism is shown in the various positions by means of which desired change speed connections may be effected. In Figure 2, the teeth 62 engage both sets of teeth 56 and 60, thus establishing a direct drive from the driving shaft 18 to the driven shaft 19. This will be apparent inasmuch as the transmission systems above described will both be locked and the mechanism will thus rotate as a unit.

In Figure 3, the collar 61 is shown moved to an extreme left position in which the teeth 62 engage only teeth 60. As a result, power is transmitted from the sleeve 22 through the gear teeth 46, pinions 47, gear 57, flange member 58, sleeve 59, gear teeth 60, teeth 62, collar 61 and clutch member 20 to the driven shaft 19. Inasmuch as pinions 47 introduce an additional gear into the transmission elements, a reversal of power results.

In Figure 4, the clutch collar 61 is shown moved to the right from the position shown in Figure 2, the teeth 62 engaging teeth 56. In such condition, power is transmitted from the sleeve 22 through the gear teeth 46, pinions 47 to 52, gear 53, sleeve 54, teeth 56 and 62, and the clutch members 61 and 20 to the driven shaft. This connection represents the low speed position of the elements.

The neutral position of the mechanism is shown in Figure 5 wherein the teeth 62 lie in the space between the teeth 56 and the clutch member 20. In such condition, no power is transmitted.

In actual practice, it is preferred to provide a two way clutch connection between the ring mounting 49 and the member 24. Such connection is illustrated in Figures 2, 7, 8 and 11. As will be seen from Figure 8, the ring mounting member 49 is provided with an inner cylindrical surface 72 upon which rollers 73 are adapted to ride. A concentric clutch member 74 is mounted upon the stationary member 24 and is provided with a plurality of cut-away portions 75 corresponding in number and position to the rollers 73. The clutch member 74 is formed with a flange 76 upon which arcuate roller spacing members 77 are formed. A notch 78 in the periphery of the flange 76 is adapted to receive a roller 79 which is mounted upon an arm 80 which is secured to a shaft 81 upon which an arm 82 is secured. The end of arm 82 is formed with a spherical bearing member 83 which is received within a V-shaped track 84 formed upon an arm 85 which is splined to the shaft 65. Oppositely extending springs 86 engage a flange 87' which is secured to the shaft 81 and thus form a yielding connection between the arm 82 and the shaft 81.

In actual practice, it is preferred to form the relatively stationary ring member 49 in such fashion as to provide for a yielding connection between the clutch formed by the members 72, 73 and 74 and the pinions 47 and 52. For this purpose this relatively stationary member is divided along the circular line shown at 87 in Figure 7 and the adjacent portions of the member 49 are formed to provide a yielding connection. To effect the foregoing, the inner portion of the member 49 is indicated at 49' and is formed with a recess 88 while the outer member 49 is formed with a projection 89 which extends into the recess 88. Springs 90 are positioned upon opposite sides of the projections 89 in order that the latter may be centered in the recess, guide rods 91 being provided to maintain the desired relation of parts as illustrated in Figure 7.

The structure by means of which the first planetary transmission mechanism is properly controlled is shown in Figure 6. In order that the conical clutch members 44 and 45 may be normally maintained in a disengaged position, springs 92 are provided, being seated against a thrust plate 93 which is seated against the bearing mechanism 23 and upon which projections 94 are formed. The ends of springs 88 are received over the projections 94 and extend through bores 95 which are formed in the pinion mounting 38. The other ends of the springs 92 are seated against abutments 96 having projections 97 which extend through an annular plate 98 and engage against the flange 43. A collar 99 is provided in the sleeve 22 and serves to locate the normal position of the member 38. In this fashion, when the thrust member 30 is moved to the right, as viewed in Figure 6, the conical bearing members 44 and 45 are brought into engagement and the entire first planetary transmission system is then moved axially with respect to the sleeve 22. After the selecting operation has been completed, the pedal 35 is released and the springs 92 move the entire first planetary transmission system to the left until the member 38 engages the locating flange 99. Continued motion of the member 43 then takes place until the conical members 44 and 45 are operated and the elements are moved into the position shown in Figure 6.

As will be seen from the foregoing description, shaft 18 is driven by the impulse transmitter which is driven by the crank shaft of the engine 15. Power is transmitted to the driven shaft 19 by means of planetary transmission systems including gears 46, 47, flange 58, sleeve 59 and clutch teeth 60 as one system, and through gears 46, 47, 52, 53, sleeve 54 and clutch teeth 56 as the other planetary system. Clutch teeth 56 and 60 are individually or simultaneously engaged by clutch teeth 62 formed upon sliding collar 61 which is splined to the clutch member 20. The construction is such that clutch teeth 62 may also be moved to disengaged position as illustrated in Figure 5, in which position the mechanism is in neutral.

In this fashion, when clutch teeth 62 engage both sets of teeth 56 and 60, the planetary transmission systems above described are locked and there is a direct or 1—1 transmission of power. When the clutch teeth 62 are disengaged from both sets of teeth 56 and 60, there is no transmission of power and the device is in neutral. When clutch teeth 62 engage only teeth 56, the flow of power is as illustrated in Figure 4 and the device is in the low speed position. When the clutch teeth 62 engage only clutch teeth 60, the flow of power is as illustrated in Figure 3 and the device is in reverse speed position.

As above referred to, with a transmitter of the type in which it is contemplated that the present invention shall be utilized, even after synchronization of the speeds of the several sets of clutch teeth, it would be extremely difficult, if not impossible, to effect a shifting operation because of the tooth pressure existing between the clutch teeth which are engaged. In order to relieve this tooth pressure, therefore, the mechanism shown in Figure 6 is provided. As previously described, this mechanism includes a planetary transmission system including pinions 39 mounted upon a carrier 45. Inasmuch as carrier 45 and gear 44 are relatively movable axially, upon depression of the clutch pedal 35, the pinion carrier 45 and gear 44 are locked by means of the conical clutch surfaces formed thereon and the pinion 39 is thus locked against rotation. As a result, the further axial shifting of the sleeve 28 and the planetary transmission system including pinions 39 results in the axial rotation of shaft 19 with respect to the driving shaft 18 and the several planetary transmissions connected therewith because of the fact that the teeth of pinion 39 ride in the spiral teeth 21. As a result, the tooth pressure existing between the clutch teeth is relieved and shifting is thus made possible.

From the foregoing it will be seen that a transmission mechanism has been provided which is particularly well suited for use in connection with an impulse transmitter of the centrifugal or inertia type. This mechanism has four stations or selections, viz., neutral, low speed, direct, and reverse connections, and the mechanism is of simple, compact and durable construction, the entire mechanism being coaxial and of constant mesh type. Inasmuch as, under direct speed conditions, the mechanism revolves as a unit, it is efficient in operation and the manual control of the selecting operations is simple and effective in operation. By means of the foregoing construction, the selection of any speed is accomplished by operations which synchronize the relatively rotating members and thus quiet operation is assured.

While the invention has been described with specific reference to the accompanying drawings, it is not to be limited save as defined in the appended claims.

I claim:

1. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means to engage the driven shaft positively with the driving shaft, and means responsive to a relative movement between the driving and driven shafts to relieve surface pressure of the means which engage the driven and driving shafts.

2. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means to engage the driven shaft positively with the driving means, a planetary gear connection between the driving and driven shafts, and friction means to cause the last named planetary means to effect a relative rotary motion between the driving and driven shafts to facilitate engagement of the means which engage the driving and driven shafts.

3. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means to engage the driven shaft positively with the driving means, a planetary gear on the driving shaft, spiral threads on the driven shaft engaged by the gear, a ring gear rotatably mounted on the driving shaft and movable axially thereof, and means to lock the ring gear to the driving shaft.

4. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means to engage the driven shaft positively with the driving means, a planetary gear on the driving shaft, spiral threads on the driven shaft engaged by the gear, a ring gear rotatably mounted on the driving shaft and movable axially thereof, cone clutch elements on the ring gear and the planetary gear, and means to move the last named cone clutch elements into engagement.

5. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, constant mesh power transmission means coaxial with the shafts and driven by the driving shaft, an axially slidable clutch on the driven shaft and adapted to engage cooperating clutch members connected to the constant mesh power transmission means, a planetary gear connection between the driving and driven shaft, and means to lock the last named gear connection to synchronize the driving and driven shafts.

6. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, constant mesh power transmission means coaxial with the shafts and driven by the driving shaft, an axially slidable clutch on the driven shaft and adapted to engage cooperating clutch members connected to the constant mesh power transmission means, a planetary gear connection between the driving and driven shaft, and friction means to lock the last named gear connection to synchronize the driving and driven shafts.

7. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, constant mesh power transmission means coaxial with the shafts and driven by the driving shaft, an axially slidable clutch on the driven shaft and adapted to engage cooperating clutch members connected to the constant mesh power transmission means, a planetary gear connection between the driving and driven shaft, the last named connection including a planet pinion having spiral teeth engaging spiral teeth on the driven shaft, and means to lock the last named planetary gear connection to synchronize the driving and driven shafts.

8. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, constant mesh power transmission means coaxial with the shafts and driven by the driving shaft, an axially slidable clutch on the driven shaft and adapted to engage cooperating clutch members connected to the constant mesh power transmission means, a planetary gear connection between the driving and driven shaft, the last named connection including a planet pinion having spiral teeth engaging spiral teeth on the driven shaft, means to mount the planet pinion slidably on the driving shaft, and means to lock the last named planetary gear connection to synchronize the driving and driven shafts.

9. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, constant mesh power transmission means coaxial with the shafts and driven by the driving shaft, an axially slidable clutch on the driven shaft and adapted to engage cooperating clutch members connected to the constant mesh power transmission means, a planetary gear connection between the driving and driven shaft, the last named connection including a planet pinion having spiral teeth engaging spiral teeth on the driven shaft, means to mount the planet pinion slidably on the driving shaft, and conical friction members to lock the planetary gear connection and turn the driven shaft with respect to the driving shaft to relieve the axially slidable clutch from rotative forces.

10. In combination with a driving and a driven shaft, a pair of constant mesh gear systems driven by the driving shaft, a clutch slidable on the driven shaft, cooperating clutch engaging means on the constant mesh gearing, stationary reaction means for the constant mesh gear systems, a clutch between the reaction means and the constant mesh systems, and a ring mounting to control the last named clutch.

11. In combination with a driving and a driven shaft, a pair of constant mesh gear systems driven by the driving shaft, a clutch slidable on the driven shaft, cooperating clutch engaging means on the constant mesh gearing, stationary reaction means for the constant mesh gear systems, a ring mounting rotatably mounted on a relatively fixed member, means to move the ring in opposite directions, rolling clutch elements actuated by the ring, a clutch element on the reaction means concentric with the ring and rolling clutch elements, and yieldable means in the reaction means to afford a yielding connection between the last named clutch elements and the constant mesh gear systems.

12. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means having tooth surfaces to engage the driven shaft positively with the driving shaft, and means responsive to a relative rotation of the driving and driven shafts to relieve tooth pressure of the means to engage the driven and driving shafts.

13. Power transmitting mechanism comprising, in combination, an inertia impulse transmitter having a torque characteristic such that at idling speed no appreciable torque is transmitted, a driving shaft driven by the transmitter, a driven shaft coaxial with the driving shaft, power transmitting means between the shafts including means to engage the driven shaft positively with the driving shaft, and means continuously positively connected to the transmitter responsive to relative rotation of the driving and driven shafts to relieve surface pressure of the means which engage the driven and driving shafts.

GUSTAV A. KLIMEK.